(12) United States Patent
Black et al.

(10) Patent No.: US 12,109,486 B2
(45) Date of Patent: Oct. 8, 2024

(54) COMPUTER SIMULATION CONTROLLER

(71) Applicant: Sony Interactive Entertainment Inc., Tokyo (JP)

(72) Inventors: Glenn Black, San Mateo, CA (US); Arthur Kwun, San Mateo, CA (US); So Morimoto, San Mateo, CA (US); Katsuhisa Tadano, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 108 days.

(21) Appl. No.: 17/522,539

(22) Filed: Nov. 9, 2021

(65) Prior Publication Data
US 2023/0147235 A1   May 11, 2023

(51) Int. Cl.
*A63F 13/24* (2014.01)
*A63F 13/40* (2014.01)

(52) U.S. Cl.
CPC ............ *A63F 13/24* (2014.09); *A63F 13/40* (2014.09)

(58) Field of Classification Search
None
See application file for complete search history.

(56) References Cited

U.S. PATENT DOCUMENTS

| 4,491,325 | A | | 1/1985 | Bersheim |
| 4,509,383 | A | | 4/1985 | Yeh |
| 4,518,164 | A | | 5/1985 | Hayford, Jr. |
| 4,560,844 | A | * | 12/1985 | Takamura ............ H01H 13/84 235/145 R |
| 5,874,906 | A | * | 2/1999 | Willner ................ G06F 3/0219 348/E5.103 |
| 5,982,356 | A | | 11/1999 | Akiyama |
| D508,052 | S | | 8/2005 | Kit et al. |
| 7,407,439 | B1 | | 8/2008 | Ochoa |
| 7,699,755 | B2 | | 4/2010 | Feldman et al. |
| 8,156,323 | B1 | | 4/2012 | Shnowske et al. |
| 8,870,653 | B2 | | 10/2014 | Yamashita et al. |
| 10,137,366 | B1 | | 11/2018 | Quesnel et al. |
| 10,751,613 | B1 | | 8/2020 | Tamura et al. |
| 11,179,629 | B1 | | 11/2021 | Bernasch et al. |
| 2003/0036417 | A1 | | 2/2003 | Ueshima |
| 2004/0090423 | A1 | | 5/2004 | Bisset |
| 2004/0180719 | A1 | | 9/2004 | Feldman et al. |

(Continued)

FOREIGN PATENT DOCUMENTS

| CN | 107648849 A | | 2/2018 | |
| EP | 1524592 A2 | * | 4/2005 | ............ A63F 13/06 |
| WO | 2014061362 A1 | | 4/2014 | |

OTHER PUBLICATIONS

"International Search Report and Written Opinion", dated Mar. 8, 2023, in the counterpart PCT application PCT/US22/78946.
Black et al., "Computer Simulation Controller with Analog Stick Device", related U.S. Appl. No. 17/522,876, Applicant's response to Non-Final Office Action filed Oct. 20, 2022.
Black et al., "Computer Simulation Controller with Analog Stick Device", related U.S. Appl. No. 17/522,876, Applicant's response to Final Office Action filed Apr. 27, 2023.

(Continued)

*Primary Examiner* — Peter J Iannuzzi
(74) *Attorney, Agent, or Firm* — John L. Rogitz; John M. Rogitz

(57) ABSTRACT

An accessibility computer game controller includes a central control button on a round base and peripheral control buttons on the base surrounding the central control button. The peripheral control buttons can have distinct sizes and shapes. An analog stick unit is reciprocatingly engaged with the base and includes a control portion rotatable relative to the base.

14 Claims, 8 Drawing Sheets

(56) References Cited

U.S. PATENT DOCUMENTS

| | | |
|---|---|---|
| 2005/0130739 A1 | 6/2005 | Argentar |
| 2005/0174337 A1 | 8/2005 | Nielsen et al. |
| 2006/0125785 A1 | 6/2006 | McAlindon |
| 2007/0052177 A1* | 3/2007 | Ikeda .............. A63F 13/24 273/317 |
| 2007/0054736 A1 | 3/2007 | See |
| 2007/0060392 A1* | 3/2007 | Sullivan .............. A63F 13/843 463/47 |
| 2007/0178966 A1 | 8/2007 | Pohlman et al. |
| 2008/0284731 A1 | 11/2008 | See et al. |
| 2009/0054146 A1 | 2/2009 | Epstein et al. |
| 2009/0096411 A1 | 4/2009 | Vanska et al. |
| 2013/0012322 A1 | 1/2013 | Pena et al. |
| 2013/0281212 A1 | 10/2013 | Tsuchiya et al. |
| 2015/0238855 A1 | 8/2015 | Uy et al. |
| 2015/0283458 A1 | 10/2015 | Burgess et al. |
| 2015/0355768 A1 | 12/2015 | Kuwahara et al. |
| 2016/0343362 A1 | 11/2016 | Brosius et al. |
| 2016/0361634 A1 | 12/2016 | Gassoway et al. |
| 2016/0361635 A1* | 12/2016 | Schmitz .............. A63F 13/22 |
| 2017/0142201 A1 | 5/2017 | Holmes |
| 2018/0076648 A1 | 3/2018 | Kumar et al. |
| 2018/0318721 A1 | 11/2018 | James et al. |
| 2019/0022522 A1 | 1/2019 | Croft |
| 2019/0176033 A1 | 6/2019 | Yonmonger et al. |
| 2019/0344166 A1 | 11/2019 | Chou et al. |
| 2019/0366206 A1 | 12/2019 | Chou et al. |
| 2020/0030693 A1 | 1/2020 | Chou et al. |
| 2021/0043177 A1 | 2/2021 | Bar-Or et al. |

OTHER PUBLICATIONS

Black et al., "Computer Simulation Controller with Analog Stick Device", related U.S. Appl. No. 17/522,876, Final Office Action dated Feb. 1, 2023.

Black et al., "Computer Simulation Controller with Analog Stick Device", related U.S. Appl. No. 17/522,876, Non-Final Office Action dated Jul. 20, 2022.

Black et al., "Computer Simulation Controller with Attachment", related U.S. Appl. No. 17/522,889, Applicant's response to Non-Final Office Action filed Nov. 15, 2022.

Black et al., "Computer Simulation Controller with Attachment", related U.S. Appl. No. 17/522,889, Applicant's response to Final Office Action filed Mar. 6, 2023.

Black et al., "Computer Simulation Controller with Attachment", related U.S. Appl. No. 17/522,889, Final Office Action dated Feb. 28, 2023.

Black et al., "Computer Simulation Controller with Attachment", related U.S. Appl. No. 17/522,889, Non-Final Office Action dated Aug. 16, 2022.

"FlamingToast, Button Mashers—3D Button Decals (Symbols Style 03)", Oct. 31, 2020, retrieved from https://www.flamingtoast.com/?product=dualshock-4-3d-button-decals-symbols-style-3.

Nield, David, "Change your controller's button configuration for more comfortable gameplay", May 30, 2013. https://www.popsci.com/diy/how-to-remap-controller/.

Black, Glenn, "Controller Button Labeling", file history of related U.S. Appl. No. 17/823,901, filed Aug. 31, 2022.

* cited by examiner

COMPUTER SIMULATION CONTROLLER

FIELD

The present application relates generally to computer simulation controllers.

BACKGROUND

Computer simulation controllers such as computer game controllers are used by simulation participants to input control signals to the simulation. As understood herein, some participants may have impairments such as visual or motor skills impairments that present challenges in operating simulation controllers.

SUMMARY

Accordingly, a device includes a central control (CC) button operable to send a signal to a computerized apparatus when the computerized apparatus is in communication with the device. The device also includes plural peripheral control (PC) buttons surrounding the CC button, each being operable to send a signal to a computerized apparatus when the computerized apparatus is in communication with the device.

In some example embodiments the CC button is round.

The computerized apparatus may include a computer simulation console. The computerized apparatus may include a computer simulation server.

In example implementations a first one of the PC buttons may include an upwardly-sloping outer region. One or more of the PC buttons may include a continuously curved contour from an inner periphery of the first one of the PC buttons closest to the CC button to an outer periphery of the first one of the PC buttons. One or more of the PC buttons may be detachably engaged with a base holding the CC button and PC buttons.

In non-limiting examples, one or more of the PC buttons viewed from the top may have a curved inner periphery closest to the CC button and sides flaring outwardly to a curved outer periphery of the first one of the PC buttons, with the curved outer periphery being larger than the curved inner periphery. One or more of the PC buttons viewed from the top can have a curved inner periphery closest to the CC button and sides flaring outwardly to a curved outer periphery of the second one of the PC buttons, with the curved outer periphery being larger than the curved inner periphery. One of the PC buttons can be larger than another one of the PC buttons.

In some examples, the curved inner periphery of a first PC button can be convex, and a curved inner periphery of a second PC button can be concave.

One or more of the PC buttons viewed from the top may have an ovular periphery. One or more of the PC buttons viewed from the top may have a racetrack-shaped periphery.

One or more of the PC buttons may be magnetically engaged with the base.

In another aspect, a method includes generating computer simulation signals to control a computer simulation using a central control (CC) button on a base of a control device, and generating computer simulation signals to control the computer simulation using plural peripheral control (PC) buttons on the base, completely surrounding the CC button.

In another aspect, a computer simulation control apparatus includes a base, a round central control (CC) element on the base, and a first number of peripheral control (PC) elements surrounding the CC element. The CC element and PC elements are operable to control a computer simulation.

The details of the present application, both as to its structure and operation, can be best understood in reference to the accompanying drawings, in which like reference numerals refer to like parts, and in which:

DETAILED DESCRIPTION

Figure 1:
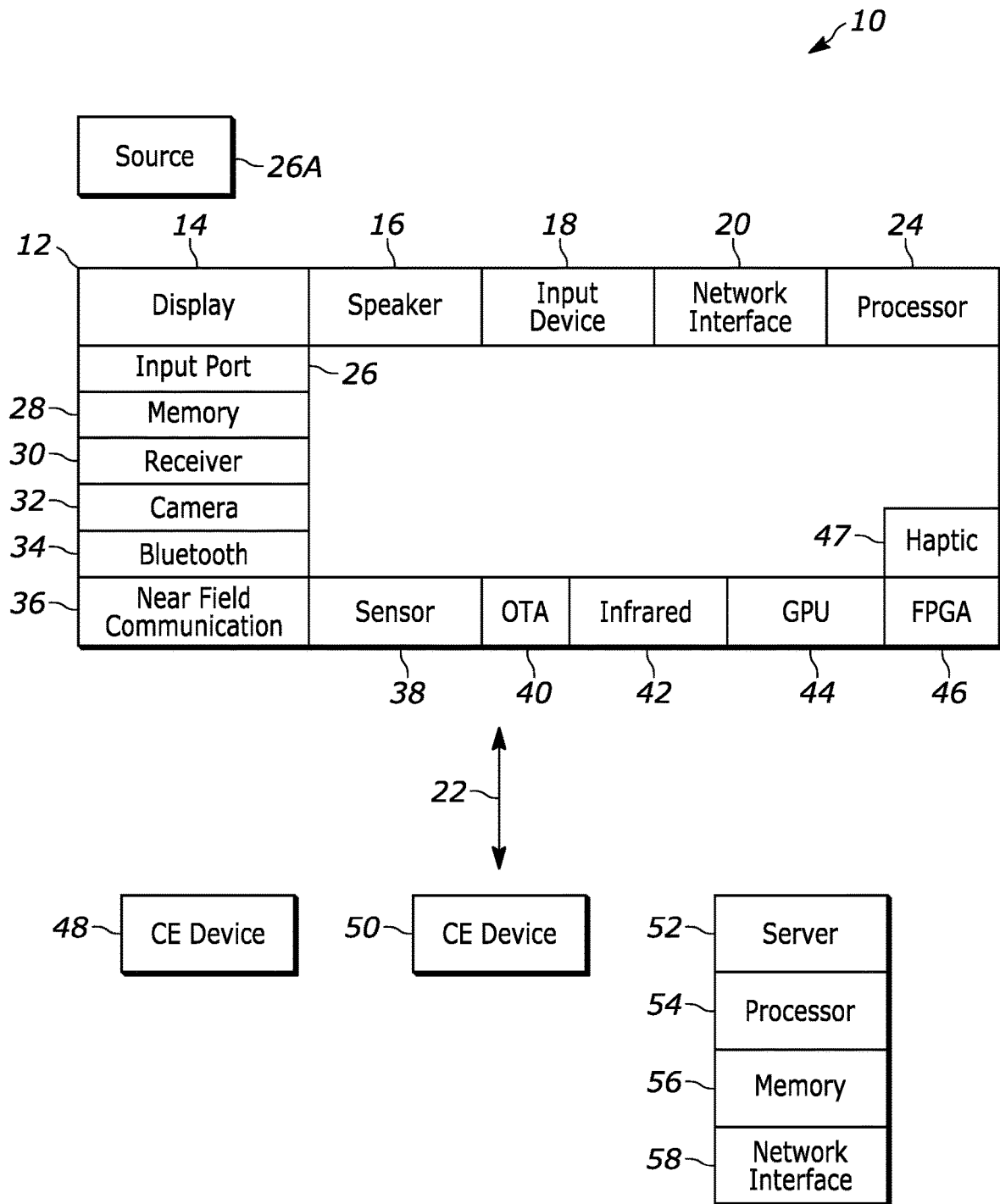
FIG. 1 is a block diagram of an example system including an example in accordance with present principles.

This disclosure relates generally to computer ecosystems including aspects of consumer electronics (CE) device networks such as but not limited to computer game networks. A system herein may include server and client components which may be connected over a network such that data may be exchanged between the client and server components. The client components may include one or more computing devices including game consoles such as Sony PlayStation® or a game console made by Microsoft or Nintendo or other manufacturer, virtual reality (VR) headsets, augmented reality (AR) headsets, portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

A processor may be a single- or multi-chip processor that can execute logic by means of various lines such as address lines, data lines, and control lines and registers and shift registers.

Components included in one embodiment can be used in other embodiments in any appropriate combination. For example, any of the various components described herein and/or depicted in the Figures may be combined, interchanged, or excluded from other embodiments.

"At least one of A, B, and C" (likewise "at least one of A, B, or C" and "at least one of A, B, C") includes A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). The AVD 12 alternatively may also be a computerized Internet enabled ("smart") telephone, a tablet computer, a notebook computer, a HMD, a wearable computerized device, a computerized Internet-enabled music player, computerized Internet-enabled headphones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Accordingly, to undertake such principles the AVD 12 can be established by some, or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input and/or output ports 26 such as a high-definition multimedia interface (HDMI) port or a USB port to physically connect to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be a separate or integrated set top box, or a satellite receiver. Or the source 26a may be a game console or disk player containing content. The source 26a when implemented as a game console may include some or all of the components described below in relation to the CE device 48.

The AVD 12 may further include one or more computer memories 28 such as disk-based or solid-state storage that are not transitory signals, in some cases embodied in the chassis of the AVD as standalone devices or as a personal video recording device (PVR) or video disk player either internal or external to the chassis of the AVD for playing back AV programs or as removable memory media or the below-described server. Also, in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24. The component 30 may also be implemented by an inertial measurement unit (IMU) that typically includes a combination of accelerometers, gyroscopes, and magnetometers to determine the location and orientation of the AVD 12 in three dimension or by an event-based sensors.

Continuing the description of the AVD 12, in some embodiments the AVD 12 may include one or more cameras 32 that may be a thermal imaging camera, a digital camera such as a webcam, an event-based sensor, and/or a camera integrated into the AVD 12 and controllable by the processor 24 to gather pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 38 (e.g., a motion sensor such as an accelerometer, gyroscope, cyclometer, or a magnetic sensor, an infrared (IR) sensor, an optical sensor, a speed and/or cadence sensor, an event-based sensor, a gesture sensor (e.g., for sensing gesture command), providing input to the processor 24. The AVD 12 may include an over-the-air TV broadcast port 40 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12. A graphics processing unit (GPU) 44 and field programmable gated array 46 also may be included. One or more haptics generators 47 may be provided for generating tactile signals that can be sensed by a person holding or in contact with the device.

Still referring to FIG. 1, in addition to the AVD 12, the system 10 may include one or more other CE device types. In one example, a first CE device 48 may be a computer game console that can be used to send computer game audio and video to the AVD 12 via commands sent directly to the AVD 12 and/or through the below-described server while a second CE device 50 may include similar components as the first CE device 48. In the example shown, the second CE device 50 may be configured as a computer game controller manipulated by a player or a head-mounted display (HMD) worn by a player. In the example shown, only two CE devices are shown, it being understood that fewer or greater devices may be used. A device herein may implement some or all of the components shown for the AVD 12. Any of the components shown in the following figures may incorporate some or all of the components shown in the case of the AVD 12.

Now in reference to the afore-mentioned at least one server 52, it includes at least one server processor 54, at least one tangible computer readable storage medium 56 such as disk-based or solid-state storage, and at least one network interface 58 that, under control of the server processor 54, allows for communication with the other devices of FIG. 1 over the network 22, and indeed may facilitate communication between servers and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server or an entire server "farm" and may include and perform "cloud" functions such that the devices of the system 10 may access a "cloud" environment via the server 52 in example embodiments for, e.g., network gaming applications. Or the server 52 may be implemented by one or more game consoles or other computers in the same room as the other devices shown in FIG. 1 or nearby.

The components shown in the following figures may include some or all components shown in FIG. 1.

Figure 2:
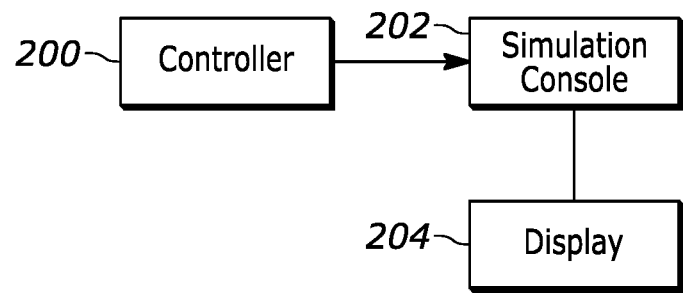
FIG. 2 illustrates a first example environment in which present principles may be used.

FIG. 2 illustrates that a controller 200 in accordance with present principles may be used to input control signals to a computer simulation console 202 to control presentation of a computer simulation executed in the console 202 on a display 204. The display 204 may be, e.g., a TV, a head-mounted display (HMD), or other display.

Figure 3:
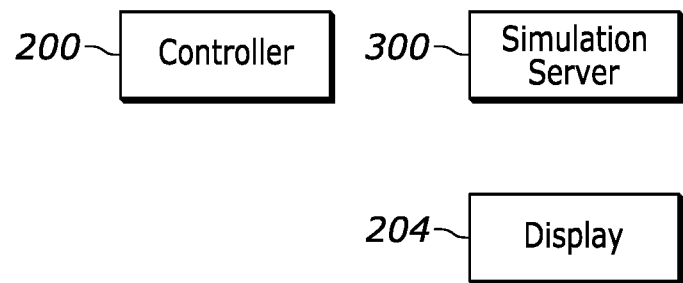
FIG. 3 illustrates a second example environment in which present principles may be used.

FIG. 3 illustrates that the controller 200 in accordance with present principles may be used to input control signals to a computer simulation server 300 as may be implemented by, e.g., the server 52 in FIG. 1 to control presentation of a computer simulation executed in the server 300 and streamed to the display 204. Now that the simulation may be streamed from the server 300 direct to the display 204 or through the simulation console 202 shown in FIG. 2.

Refer now to FIGS. 4-10 for example details of the controller 200 shown in FIGS. 2 and 3. The individual components of the controller 200 discussed below may be made of plastic such as injection-molded plastic, ink-jet printed plastic including as may be produced by the manufacturer or by an end user, composite material, metal, or combinations thereof.

A base 400 that in the example shown has a round periphery supports on its top plural control buttons, including a central control (CC) button 402 operable to send a signal to a computerized apparatus such as the server 300 in FIG. 3 or simulation console 202 in FIG. 2 when the computerized apparatus is in wired and/or wireless communication with the controller. The CC button 402 in the non-limiting example shown is round and may have a gently convex top surface. Other shapes may be used.

In an example embodiment, the CC button 402 has two functions, a normal operating button, and an arm/palm rest. The CC button 402 can have a lock mechanism to stop moving in up-down direction in the case of using as the palm/arm rest.

A circular light emitting portion 403 (best shown in FIG. 7) is located around the center button so that the light emitting portion can be seen the same from all directions. One or more light emitting diodes (LED) or other light sources may be positioned under the portion 403, which is transparent or translucent, to provide light that propagates through the portion 403.

Plural peripheral control (PC) buttons 404 surround the circular light emitting portion 403 and, hence, surround the CC button 402 as shown, and in the non-limiting example shown completely surround the CC button 402 with only small spaces remaining between adjacent PC buttons. The PC buttons 404 may have different shapes, sizes, colors, and textures from each other. Some of the PC buttons 404 may have identical sizes, shapes, colors, and textures if desired. Each PC button is operable to send a signal to a computerized apparatus when the computerized apparatus is in communication with the device.

Figure 4:
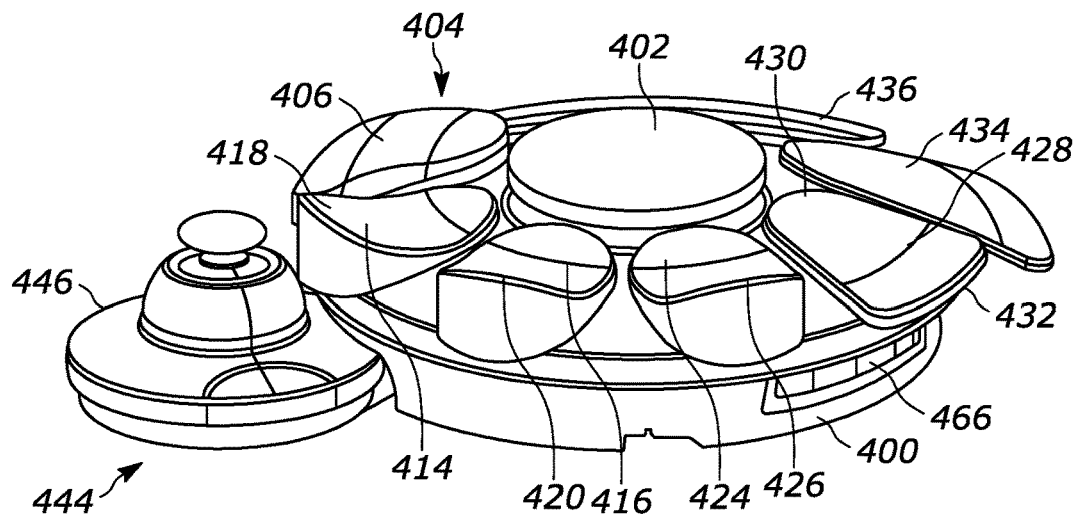
FIG. 4 illustrates a top perspective view of the controller with the analog stick unit in the near position.
Figure 6:
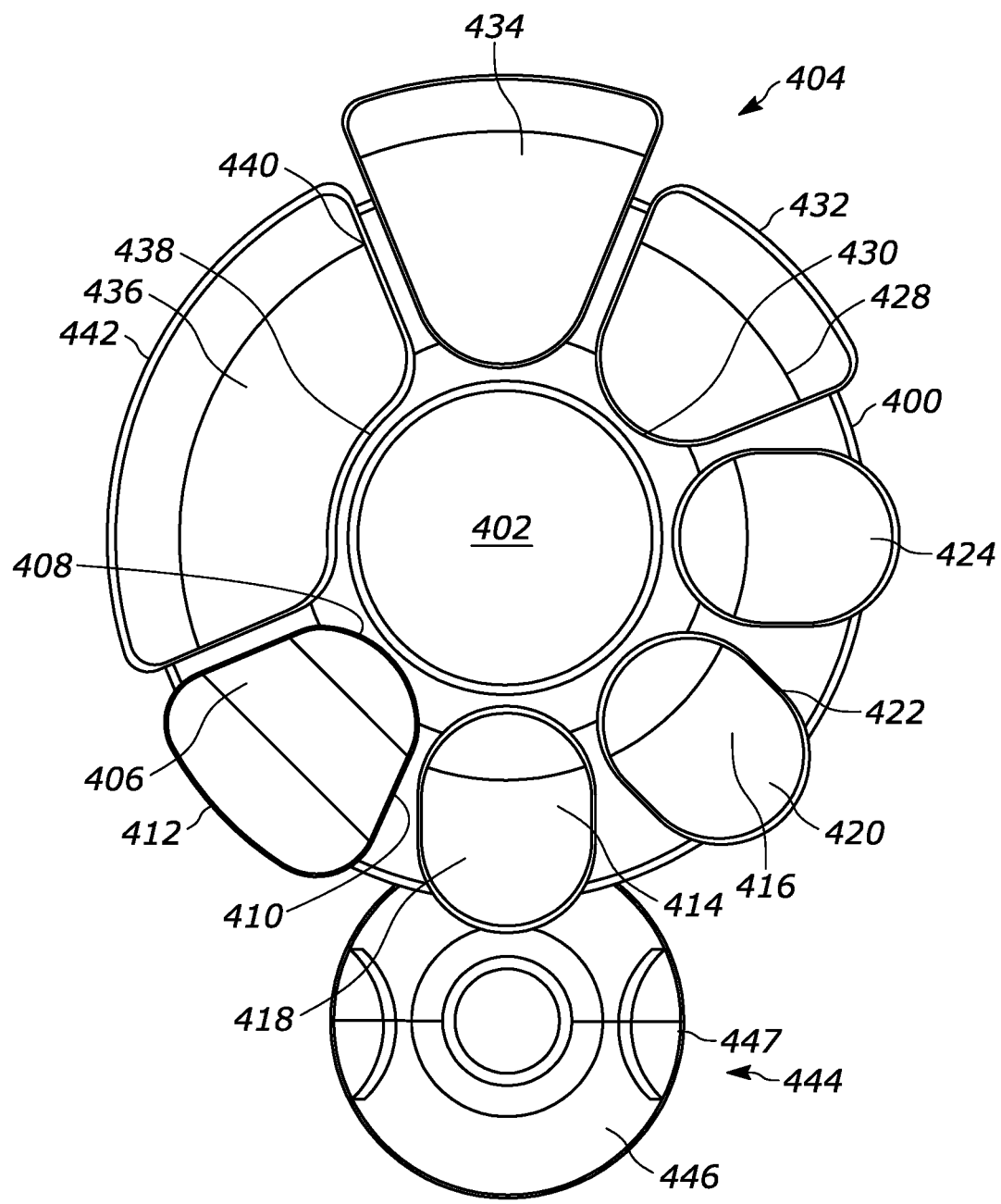
FIG. 6 illustrates a top plan view of the controller with the analog stick unit in the near position.

As perhaps best shown in FIGS. 4 and 6, as labeled in FIGS. 4 and 6 one or more of the PC buttons 404 may have an outer edge strip that overhangs (extends radially outwardly past the periphery of) the base 400 to facilitate button replacement, such as by one finger or by the elbow. Thus, an edge of a PC button top may have a shape to protrude beyond the edge of the controller base 400.

In the non-limiting example shown, a first PC button 406 in top plan view, includes a curved inner periphery 408 closest to the CC button 402 and sides 410 that flare outwardly to a slightly curved or straight outer periphery 412. The outer periphery 412 is larger (longer) than the inner periphery 408. The first PC button 406 may have a flat top surface or a gently convex top surface and may slope from a center of the top surface in both the radial (the dimension from the center of the controller toward the outer edge of the controller) and azimuthal dimensions.

In the non-limiting example shown, adjacent the first PC button 406 is a second PC button 414, and adjacent the second PC button 414 is a third PC button 416 that may be identically configured and sized to the second PC button 414. Unlike the first PC button 404, the second and third PC buttons 414, 416 may have upwardly-sloping outer regions 418, 420, respectively, and instead of having sides that flare outwardly from their respective inner peripheries to their respective outer peripheries, the inner and outer peripheries are substantially the same length and the sides 422 of the second third PC buttons 414, 416 are straight to establish, along with the inner and outer peripheries, a racetrack-shaped periphery for the respective PC button. Or, the sides 422 may be gently convex to establish, along with the inner and outer peripheries, an ovular periphery for the respective PC button.

It will be appreciated that the second and third PC buttons 414, 416 have upwardly-sloping outer regions 418, 420, respectively, that represent a slope discontinuity from where they begin, essentially at the edge of a downwardly-sloping inner region.

In the non-limiting example shown, a fourth PC button 424 may be next to the third PC button 416 and may have the same top plan shape as the second and third buttons 414, 416 and the same configuration of an upwardly-sloping outer region 426.

In the non-limiting example shown, a fifth PC button 428 may be next to the fourth PC button 424 and may have a flat or gently continuously downwardly-sloping contour from a convex inner periphery 430 of the fifth PC button 428 closest to the CC button to a convex outer periphery 432.

In the non-limiting example shown, a sixth PC button 434 may be next to the fifth PCT button 428 and may be identically configured in shape to the fifth PC button 428 but may be larger in size than the fifth PC button 428.

In the non-limiting example shown, a seventh PC button 436 may be between the sixth PC button 434 and the first PC button 406 as shown and may be larger than the other PC buttons. As best shown in FIG. 6, the seventh PC button 436 may have a concave inner periphery 438, in contrast to the other PC buttons which may have convex inner peripheries, with outwardly-flaring straight sides 440 extending from the inner periphery 438 to a convex outer periphery 442.

Figure 7:
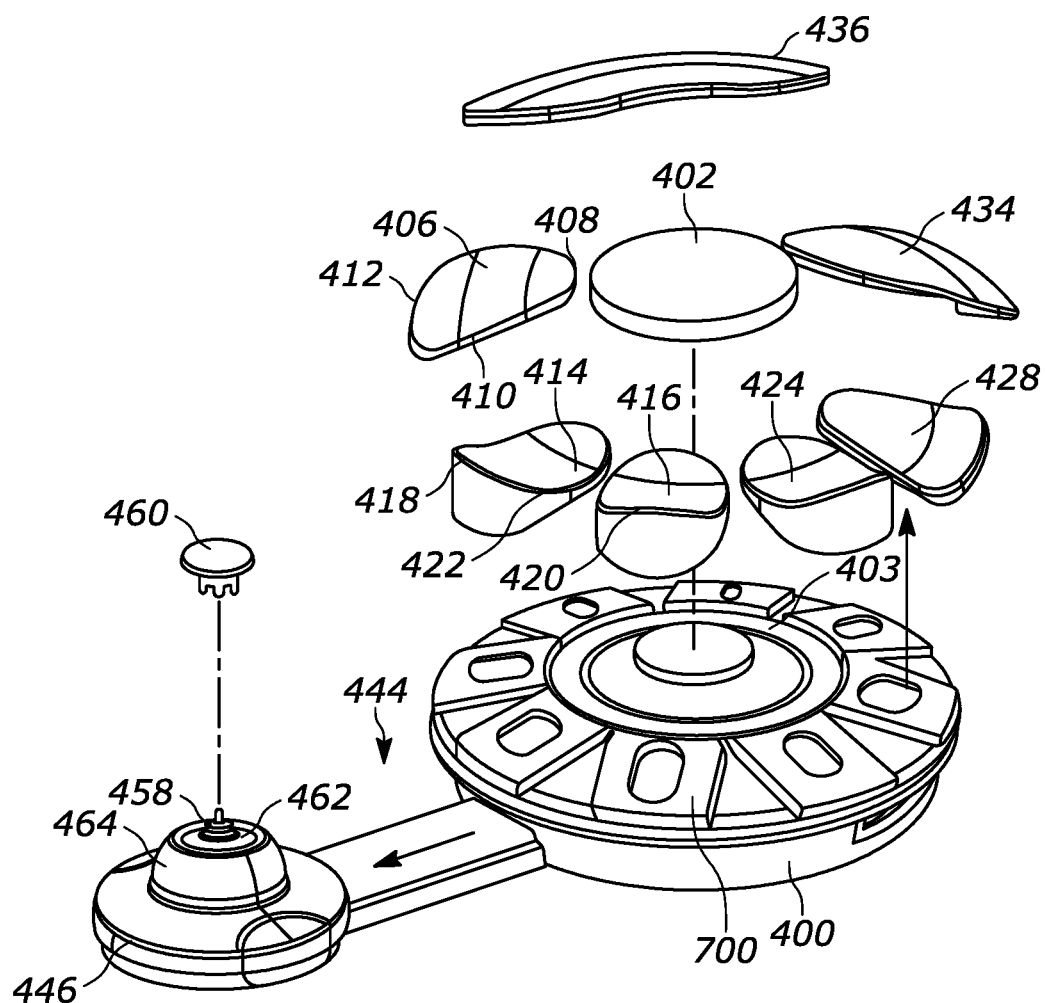
FIG. 7 illustrates an exploded top perspective view of the controller with the analog stick unit in the extended position.
Figure 8:
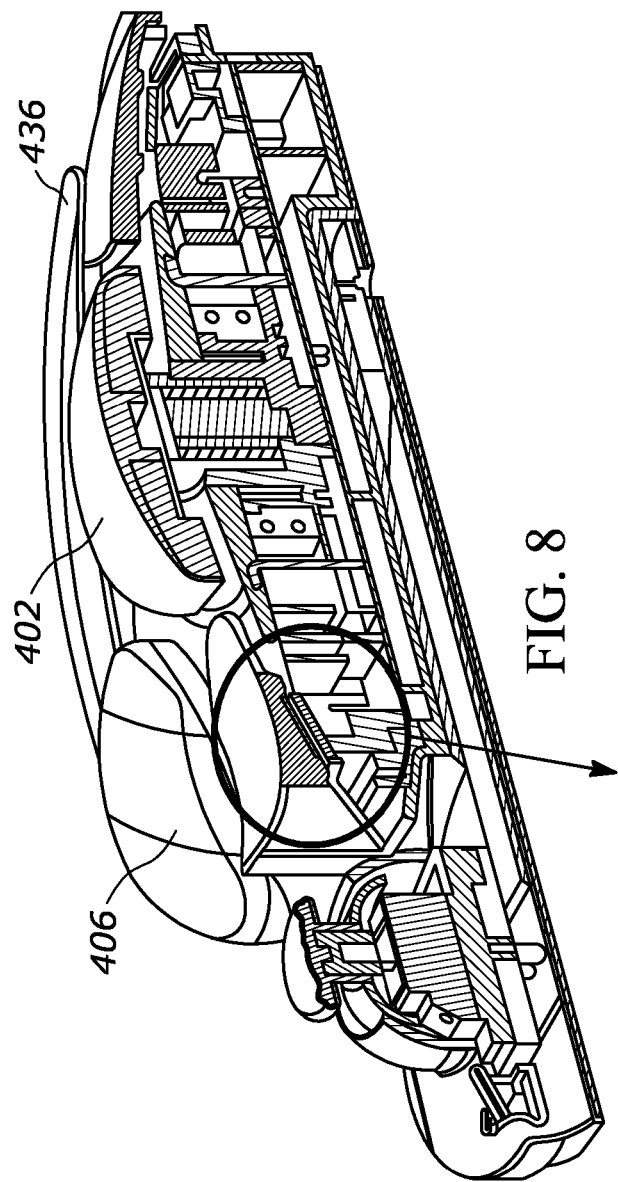
FIG. 8 illustrates a cut-away perspective view of the controller.
Figure 10:
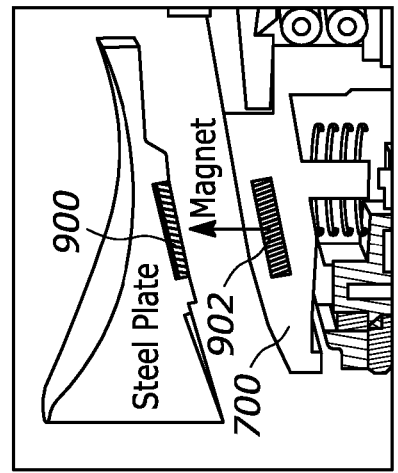
FIG. 10 illustrates the detail of FIG. 8 showing the control button disengaged from the pad in the base.
Figure 9:
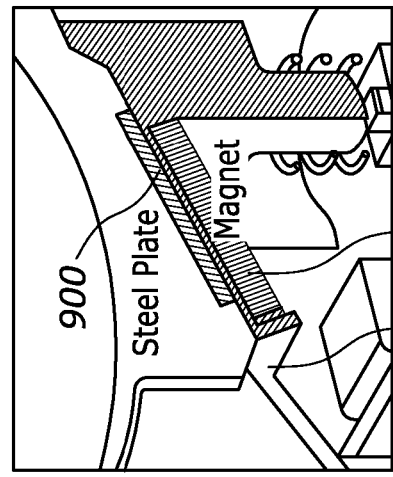
FIG. 9 illustrates a detail of FIG. 8 showing a control button mechanically coupled to a pad in the base.

One or more, and in the example shown all, of the PC buttons 404 may be detachably engaged with the base 400. In the specific non-limiting example shown and as best shown in FIG. 7, each PC button 404 may be detachably engaged with a respective pad 700 on the base 400. The detachable engagement may be a friction or snapping fit between a PC button 404 and its respective pad 700, or as best shown in FIGS. 9 and 10 the engagement may be magnetic. Specifically, as shown in FIGS. 9 and 10, each button 402, 404 may be coupled to a respective ferromagnetic plate 900 (such as steel) to magnetically engage a respective magnet 902 in the respective pad 700. It is to be understood that the magnet may be in the button and the ferromagnetic plate may be in the pad of the base.

Thus, the button covers may be moved to different underlying controls on the base 400. As well, the functions of the controls themselves may be defined by the user.

Each button 402, 404 may have its own unique color different from the other buttons. Or, some buttons 402, 404 may have a first color and one or more other buttons may have different colors than the first color. For example, the second through fourth buttons 414, 416, 424 may all have the same color, and that color may be different than the colors of other buttons. One or more buttons may have raised Braille patterns embossed or otherwise formed on the top of the button to assist a visually impaired person identifying the button.

The top surface of each button 402, 404 that is touched by a user may have its own unique texture different from the other buttons. Or, some buttons 402, 404 may have a first texture and one or more other buttons may have different textures than the first texture. For example, the second through fourth buttons 414, 416, 424 may all have the same texture, and that texture may be different than the textures of other buttons. A first texture may be, e.g., smooth and a second texture may be, e.g., roughened, lined, dimpled, or other tactilely distinguishing texture.

Button shapes other than those described above may be used. A number of buttons different than that described above may be used. This recognition is part of current inventive principles and forms no part of the prior art.

Return to FIGS. 4-7. In addition to the plural control buttons 402, 404 arranged on the base 400 and operable to send signals to a computerized apparatus when the computerized apparatus is in communication with the device, an analog stick unit (ASU) 444 is reciprocatingly engaged with the base 400 for movement between a near position (FIGS. 4-6), in which a control portion 446 of the ASU 444 is closely juxtaposed with the base 400, and an extended position (FIG. 7), in which the control portion 446 of the ASU 444 is distanced from the base 400. Moreover, as explained elsewhere herein, the control portion 446 is rotatable relative to the base 400. In both near and extended configurations and in various angular orientations the control portion 446 of the ASU can be manipulated to input control signals to a computerized apparatus.

The control portion 446 may be a joystick-type input device. "North" for the control portion 446 may be defined by the factory or by the user to best suit the user's needs using, e.g., a user interface permitting the user to define which radial direction on the ASU 444 "north" should be.

Additional control keys 447 may be provided on the ASU 444 next to the control portion 446 as shown for manipulation to generate additional control signals for game play.

Figure 5:
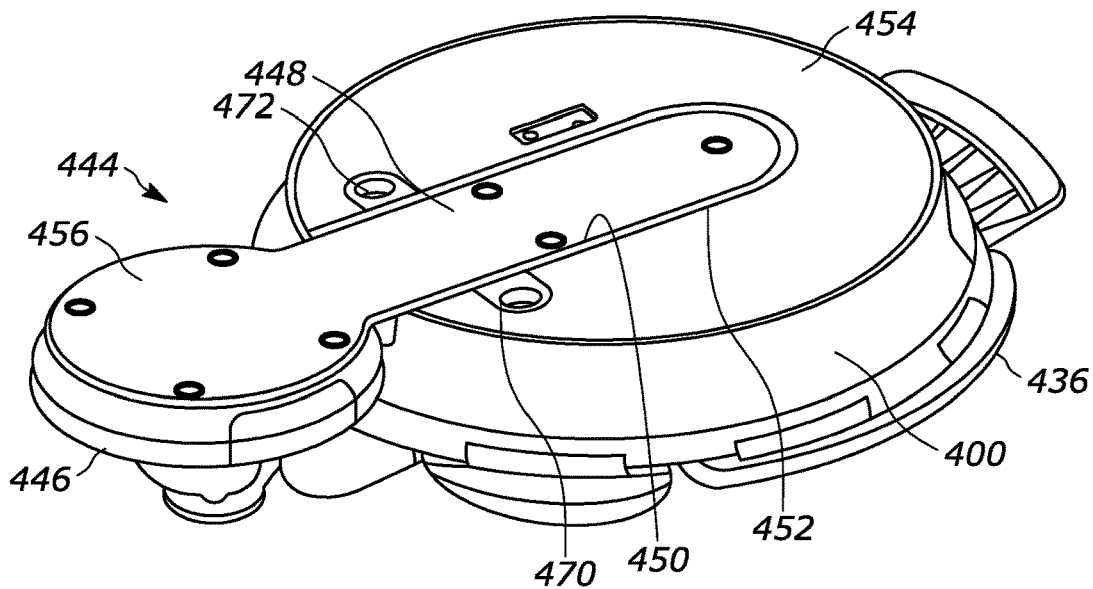
FIG. 5 illustrates a bottom perspective view of the controller with the analog stick unit in the near position, with example attachments shown in an exploded relationship to the base.
Figure 5:
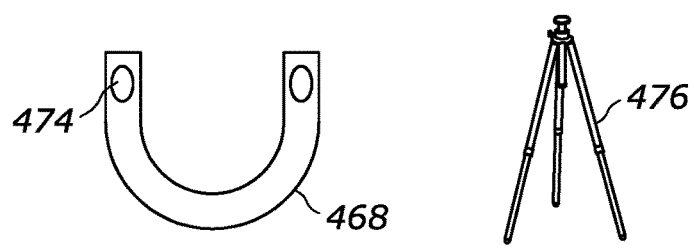

As perhaps best shown in FIG. 5, the ASU 444 includes a flat platform that in turn includes a slide 448 with opposed parallel sides 450 that are slidably engaged with a receptacle 452 in the base 400 (e.g., by being slidably engaged with a flat disk-like base plate 454 of the base 400). It will be appreciated that the receptacle 452 is on the bottom of the base 400 and the control buttons 402, 404 are on a top of the base.

The flat platform may also include, at one end of the slide 448, a disk-shaped support 456 on which the control portion 446 is rotatably mounted. In the example shown, both the support 456 and the control device 446 are round and have substantially equal diameters. The support 456 and slide 448 may be made of a single unitary piece of material such as plastic. Or, separate construction may be used to combine non-skid rubber parts with plastic parts.

The control device 446 is manipulable to generate a signal to a computerized apparatus. In one non-limiting example and as perhaps best shown in FIG. 7, the control device 446 may include a point-and-click device, in the example shown, a button 458 with button cover 460 to depress the button 458 to generate a signal, with the button 458 being mounted on a rotatable ball 462 in a round socket 464 that rises upwardly in the center of the ASU 446 as shown.

The button cover 460 has a relatively large size and may be formed with a string hole at the top to receive a fastening or carrying string or cord thereto.

With respect to electrical connectors associated with the ASU 446, all connectors 466 (FIG. 4) such as but not limited to universal serial bus (USB) connectors may be located at the opposite side to the analog stick unit for avoiding cable interference with the operation of the analog stick by a user. In particular, a USB connector may be placed 180 degrees away from the analog stick on the opposite side. This is because the USB cable is the thickest of all the cables expected to be connected to the device and may affect the posture of the device in use.

In addition, since the digital audio and analog audio connectors look the same, each may be located on both sides of the USB connector so that they can be distinguished.

In some embodiments, a flexible buckle attachment 468 (FIG. 5) made of soft material, such as silicon, rubber, and elastic member can be attached on the rear surface of the base 400. The flexibility of the buckle attachment allows it to deform along the attached portion, such as user's leg, arm, or wheelchair arm, so it can be attached stably.

In the example shown, as best illustrated in FIG. 5 two threaded holes 470 may be formed on the bottom or other surface of the base 400. Respective fasteners 472 may pass through respective holes 474 of the attachment 468 and may engage the holes 470 in the base 400 to hold the base and attachment together. Other attachments such as a tripod 476 similarly may be engaged with the base 400.

Figure 11:
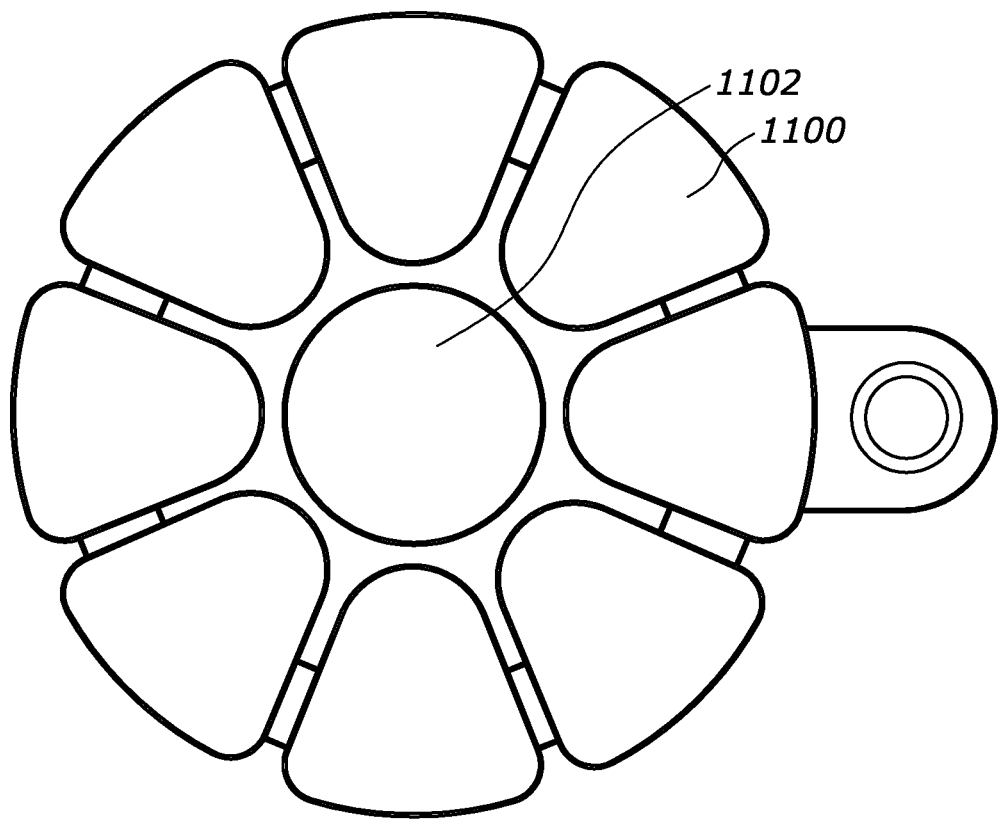
FIG. 11 illustrates an example alternative button layout.

FIG. 11 illustrates an alternate button layout in which eight peripheral buttons 1100 surround a round central button 1102. The peripheral buttons 1100 may have identical shapes and sizes, and in the example shown may be shaped like the first PC button 406 shown in FIG. 4. The buttons may be symmetrically arranged the periphery of the base in this and in other embodiments.

Figure 12:
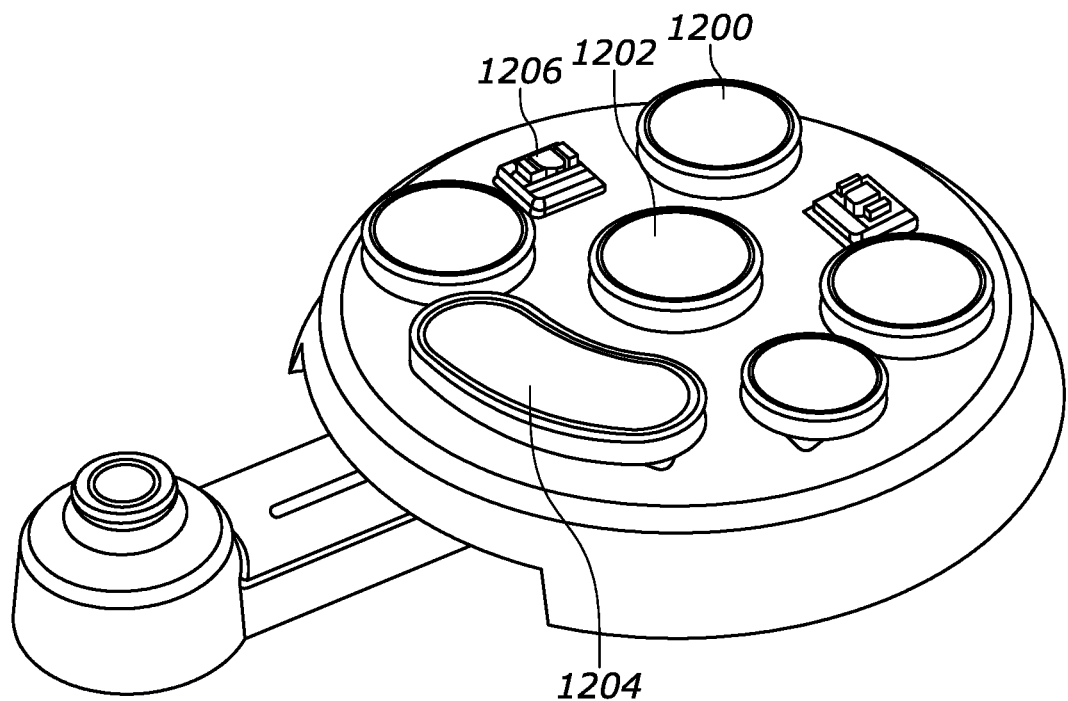
FIG. 12 illustrates another example alternative button layout.

FIG. 12 illustrates an alternate button layout in which peripheral buttons 1200 surround a round central button 1202. Some or all the peripheral buttons 1200 may have identical shapes and sizes such as round. In the example shown four of the peripheral buttons 1200 are round and one of the round peripheral buttons is smaller than the other three peripheral buttons, while one of the peripheral buttons (labeled 1204) is oblong and curved azimuthally as shown. Two of the peripheral buttons (labeled 1206) may be small flat rectilinear buttons.

Figure 13:
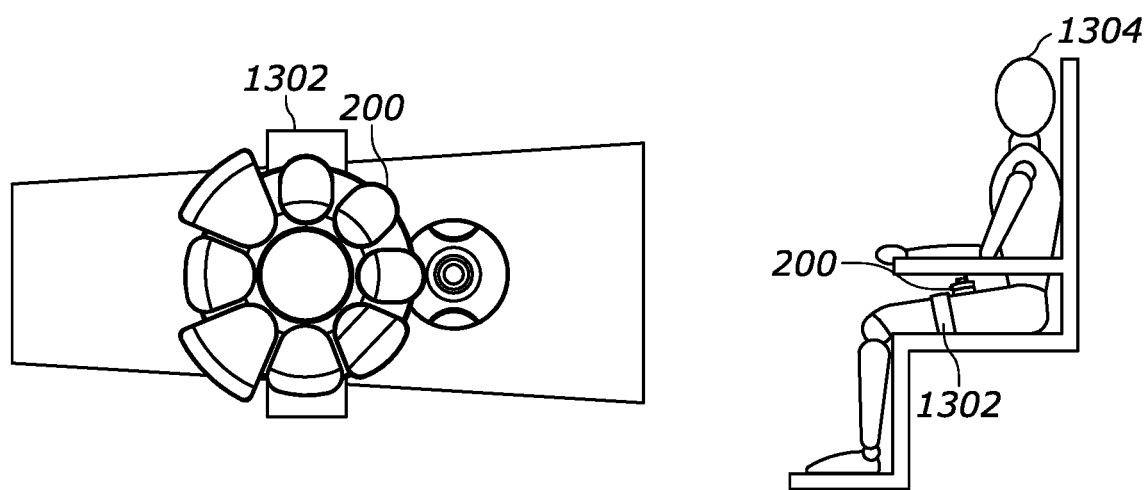
FIG. 13 illustrates the attachment when configured as a leg strap connecting the base to a user.

FIG. 13 illustrates a controller 200 according to present principles engaged with an attachment 1302, in this case, a leg band or strap that is flexible and that may secure the controller 200 to the leg or other part of a user 1304. Attachment may be effected as described above using fasteners and threaded holes in the base of the controller such that the controller 200 only faces one or two ways when mounted on the user's thigh, for example.

In some embodiments two controllers may be provided, one configured for optimal operation by one hand of a user and the other configured for optimal operation by the other hand of the user.

While the particular embodiments are herein shown and described in detail, it is to be understood that the subject matter which is encompassed by the present invention is limited only by the claims.

What is claimed is:

1. A device, comprising:
    a central control (CC) button operable to send a signal to a computerized apparatus when the computerized apparatus is in communication with the device, the CC button being in the center of a base;
    plural peripheral control (PC) buttons on the base and surrounding the CC button with azimuthal spacings between adjacent PC buttons being equal around the CC button, each PC button being operable to send a signal to a computerized apparatus when the computerized apparatus is in communication with the device; and
    a circular light emitting portion around the CC button so that the light emitting portion can be seen from plural directions.

2. The device of claim 1, wherein the CC button is round.

3. The device of claim 1, wherein the computerized apparatus comprises a computer simulation console.

4. The device of claim 1, wherein the computerized apparatus comprises a computer simulation server.

5. The device of claim 1, wherein a first one of the PC buttons comprises an upwardly-sloping outer region having a different slope than an inner region of the first one of the PC buttons.

6. The device of claim 1, wherein at least a first one of the PC buttons viewed from the top comprises a curved inner periphery closest to the CC button and sides flaring outwardly to a curved outer periphery of the first one of the PC buttons, the curved outer periphery being larger than the curved inner periphery.

7. The device of claim 6, wherein at least a second one of the PC buttons viewed from the top comprises a curved inner periphery closest to the CC button and sides flaring outwardly to a curved outer periphery of the second one of the PC buttons, the curved outer periphery being larger than the curved inner periphery, the second one of the PC buttons being larger than the first one of the PC buttons.

8. The device of claim 6, wherein the curved inner periphery of the first one of the PC buttons is convex, and wherein at least a second one of the PC buttons viewed from the top comprises a curved inner periphery closest to the CC button and sides flaring outwardly to a curved outer periphery of the second one of the PC buttons, the curved outer periphery being larger than the curved inner periphery, the curved inner periphery of the second one of the PC buttons being concave.

9. The device of claim 8, wherein the second one of the PC buttons is larger than the first one of the PC buttons.

10. The device of claim 1, wherein at least a first one of the PC buttons viewed from the top comprises a periphery with convex sides between curved inner and outer peripheries.

11. The device of claim 1, wherein at least a first one of the PC buttons viewed from the top comprises a periphery with straight sides between curved inner and outer peripheries.

12. The device of claim 1, wherein at least the first one of the PC buttons is magnetically engaged with the base.

13. A device, comprising:
    a central control (CC) button operable to send a signal to a computerized apparatus when the computerized apparatus is in communication with the device, the CC button being in the center of a base;
    plural peripheral control (PC) buttons on the base and surrounding the CC button with azimuthal spacings between adjacent PC buttons being equal around the CC button, each PC button being operable to send a signal to a computerized apparatus when the computerized apparatus is in communication with the device; and
    an outer edge strip on at least one of the PC buttons that overhangs, by extending radially outwardly past the periphery of, a base on which the PC buttons are engaged to facilitate button replacement.

14. A device, comprising:
    a central control (CC) button operable to send a signal to a computerized apparatus when the computerized apparatus is in communication with the device, the CC button being in the center of a base; and
    plural peripheral control (PC) buttons on the base and surrounding the CC button with azimuthal spacings between adjacent PC buttons being equal around the CC button, each PC button being operable to send a signal to a computerized apparatus when the computerized apparatus is in communication with the device;
    wherein at least a first one of the PC buttons comprises a continuously downwardly-sloping contour from a convex inner periphery of the first one of the PC buttons to a convex outer periphery of the first one of the PC buttons.

\* \* \* \* \*